(12) United States Patent
Kim

(10) Patent No.: US 7,580,267 B2
(45) Date of Patent: Aug. 25, 2009

(54) PORTABLE TERMINAL HAVING SLIDING MODULE

(75) Inventor: Yong-Kyu Kim, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 450 days.

(21) Appl. No.: 11/375,059

(22) Filed: Mar. 15, 2006

(65) Prior Publication Data

US 2006/0278428 A1    Dec. 14, 2006

(30) Foreign Application Priority Data

Jun. 14, 2005  (KR) ...................... 10-2005-0050990

(51) Int. Cl.
*H05K 5/00* (2006.01)
(52) U.S. Cl. .................. 361/755; 361/727; 361/814
(58) Field of Classification Search ................ 361/755, 361/679–681, 686, 727, 814
See application file for complete search history.

(56) References Cited

U.S. PATENT DOCUMENTS

| 6,602,953 | B1 * | 8/2003 | Horio et al. .................... 525/63 |
| 6,822,871 | B2 * | 11/2004 | Lee et al. .................... 361/727 |
| 7,102,881 | B2 * | 9/2006 | Park et al. .................... 361/683 |
| 7,363,066 | B2 * | 4/2008 | Im et al. .................... 455/575.4 |
| 2006/0025184 | A1 * | 2/2006 | Cho et al. ................ 455/575.4 |
| 2006/0110988 | A1 * | 5/2006 | Lee ............................. 439/752 |
| 2007/0032278 | A1 * | 2/2007 | Lee et al. ................ 455/575.4 |
| 2007/0187563 | A1 * | 8/2007 | Ogatsu .................. 248/346.03 |

FOREIGN PATENT DOCUMENTS

| CN | 2681471 | 2/2005 |
| CN | 1617548 | 5/2005 |
| JP | 100453644 | 10/2004 |
| WO | WO 2005/020452 | 3/2005 |

* cited by examiner

*Primary Examiner*—Dean A. Reichard
*Assistant Examiner*—Xiaoliang Chen
(74) *Attorney, Agent, or Firm*—Roylance, Abrams, Berdo & Goodman, L.L.P.

(57) ABSTRACT

A portable terminal includes a first housing, a second housing, and a sliding module. The second housing is slidably connected to the first housing such that the second housing slides longitudinally on the first housing to open or close a face of the first housing. The sliding module is interposed between the first housing and the second housing to slidably combine the second housing to the first housing. The sliding module includes a pair of guide rods and a guide plate. The guide rods are mounted spaced apart on the rear face of the second housing along a sliding direction of the second housing. The guide plate is fixed to a face of the first housing. The guide plate is slidably connected to the guide rods.

20 Claims, 5 Drawing Sheets

PORTABLE TERMINAL HAVING SLIDING MODULE

CROSS REFERENCE TO RELATED APPLICATION

This application claims the benefit under 35 U.S.C. § 119(a) of an application entitled "Portable Terminal Having Sliding Module" filed in the Korean Intellectual Property Office on Jun. 14, 2005 and assigned Serial No. 2005-50990, the entire contents of which are hereby incorporated by reference.

BACKGROUND OF THE INVENTION

1. Field of the Invention

The present invention generally relates to a portable terminal. More particularly, the present invention relates to a portable terminal having a sliding module that combines a pair of housings to allow one of the housings to slidably move in a longitudinal direction with respect to the other housing.

2. Description of the Related Art

Generally, portable terminals can be classified into bar-type terminals, flip-type terminals, and folder-type terminals according to their appearance.

The bar-type terminal has a single housing in which data input and output means, a transmitting unit, and a receiving unit are mounted. A keypad is the data input means and is exposed at all times, such that the bar-type terminal is likely to malfunction. Moreover, there is a limitation on miniaturization of the bar-type terminal because a sufficient distance should be maintained between the transmitting unit (or mouthpiece) and the receiving unit (or earpiece).

The flip-type terminal includes a main body, a flip, and a hinge module that combines the main body with the flip. In the flip-type terminal, data input and output means, the transmitting unit, and the receiving unit are mounted in the main body and malfunctioning can be prevented by the flip that covers a keypad that acts as a data input means. However, there is also a limitation on miniaturization of the flip-type terminal because a sufficient distance should be maintained between the transmitting unit and the receiving unit.

The folder-type terminal includes a main body, a folder, and a hinge module that rotatably combines the main body with the folder. The folder is opened and closed by rotation. When the folder is folded on the main body, it is possible to prevent a keypad from malfunctioning through a call wait mode. When the folder is opened in a call mode, a sufficient distance can be secured between the transmitting unit and the receiving unit, contributing to miniaturization of the terminal. For these reasons, folder-type terminals have become mainstream portable terminals.

With the diversification of designs of portable terminals, sliding-type terminals having two housings, one of which is opened by sliding on the other, have gradually come into widespread use.

In the simplest form of the sliding-type terminal, a predetermined-length guide groove is formed in one face of a housing, a guide protrusion is formed in one face of the other housing, and the guide protrusion is slidably combined with the guide groove. However, since users should directly move the housing such that the housing slides along the other housing, such configuration is inconvenient to use.

To solve this problem, a sliding-type terminal having a sliding module like a hinge device of a folder-type terminal has been widely used. The sliding module provides a driving force in a direction in which a housing closes the other housing in a predetermined section and a driving force in a direction in which the housing opens the other housing in the remaining section. The sliding-type terminal having the sliding module is disclosed in Korean Patent Publication No. 2004/85739A1 filed by the present applicant on May 6, 2004, which is hereby incorporated by reference. However, the disclosed sliding module has a structure in which a sliding guide and a spring module are stacked between housings, resulting in an increase of the thickness of the sliding-type terminal. In other words, the sliding-type terminal is convenient to use, but has a limitation on miniaturization. Additionally, since a separate spring module should be assembled and mounted in the sliding-type terminal, a process of manufacturing the sliding-type terminal is complex, causing degradation in assembly efficiency and productivity.

Accordingly, a need exists for a portable terminal in which a second housing slides with respect to a first housing.

SUMMARY OF THE INVENTION

It is, therefore, an object of the present invention to provide a portable terminal having a sliding module that generates a driving force in a direction in which a housing closes the other housing in a predetermined section and a driving force in a direction in which the housing opens the other housing in the remaining section.

It is another object of the present invention to provide a portable terminal having a sliding module that is easily assembled and thus improves productivity.

To achieve the above and other objects, a portable terminal includes a first housing, a second housing, and a sliding module. The second housing is slidably combined with the first housing such that the second housing slides longitudinally on the first housing to open or close a face of the first housing. The sliding module is interposed between the first housing and the second housing to slidably combine the second housing to the first housing. The sliding module includes a pair of guide rods and a guide plate. The guide rods are mounted spaced apart on the rear face of the second housing along a sliding direction of the second housing. The guide plate is fixed to a face of the first housing. The guide rods are slidably combined with the guide plate.

Other objects, advantages, and salient features of the invention will become apparent from the detailed description, which, taken in conjunction with the annexed drawings, discloses preferred exemplary embodiments of the invention.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF EXEMPLARY EMBODIMENTS

An exemplary embodiment of the present invention is described in detail with reference to the annexed drawings. In the following description, a detailed description of known functions and configurations incorporated herein has been omitted for clarity and conciseness.

Figure 1:
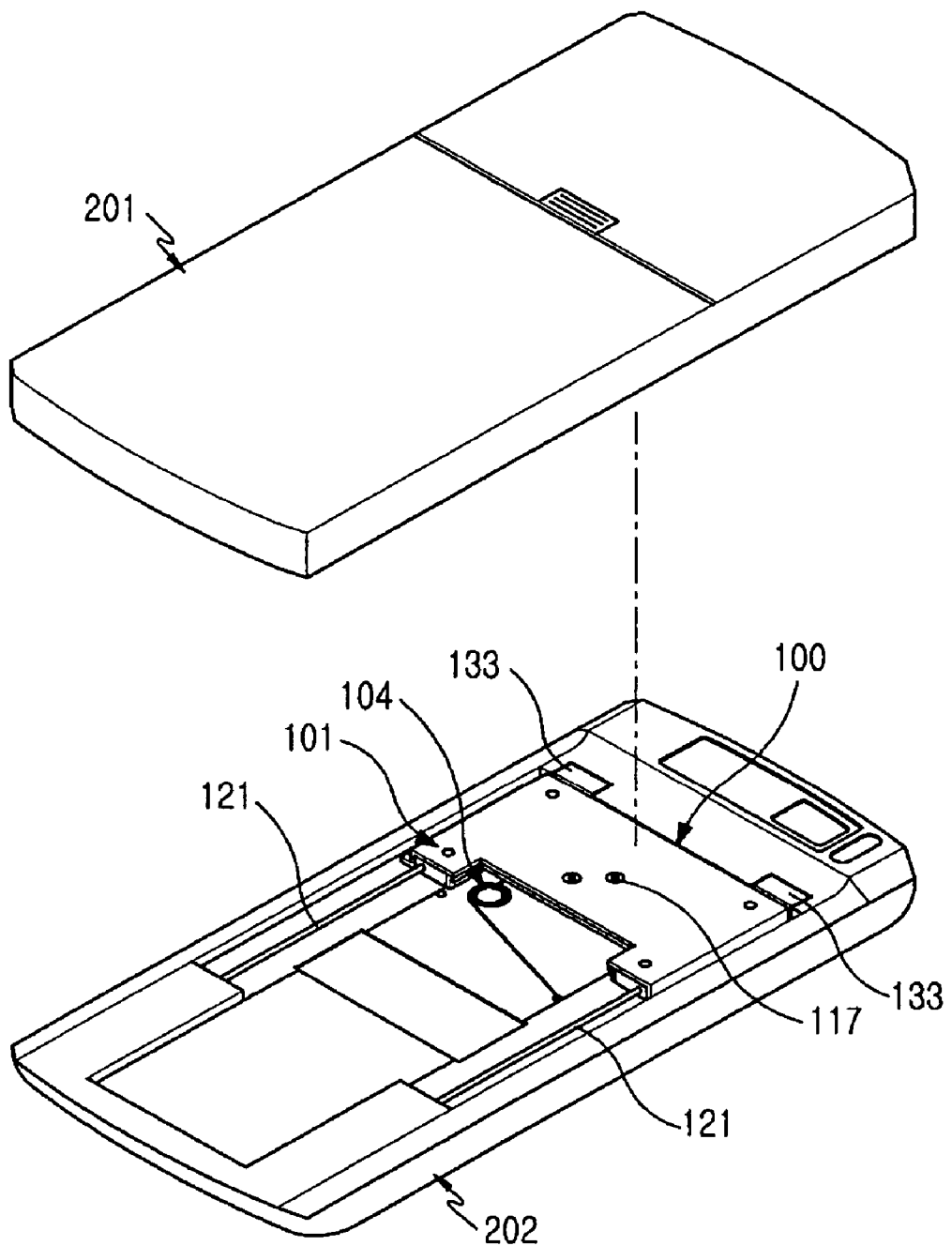
FIG. 1 is an exploded perspective view of a portable terminal having a sliding module according to an exemplary embodiment of the present invention.
Figure 2:
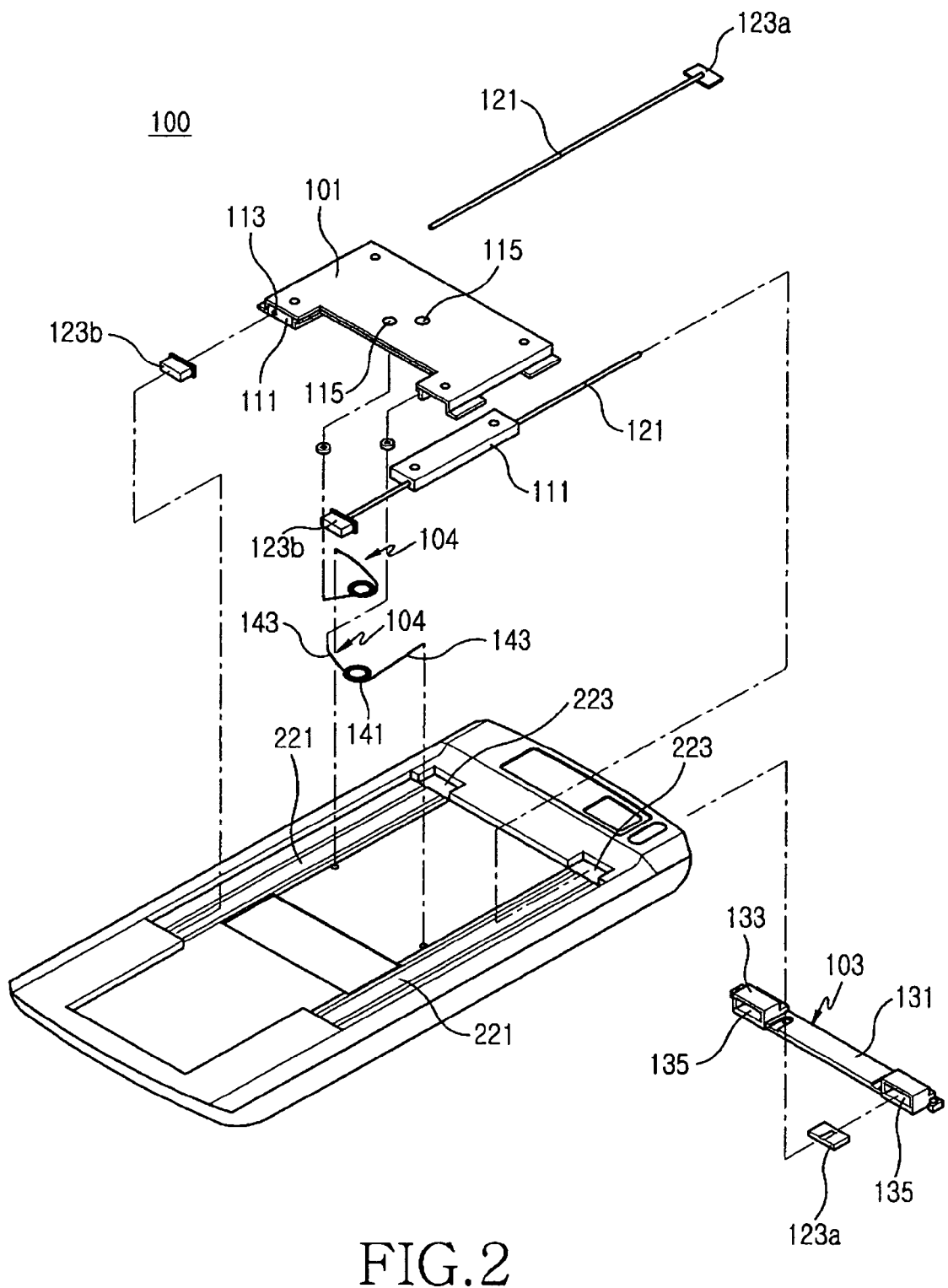
FIG. 2 is an exploded perspective view of the sliding module of the portable terminal of FIG. 1.
Figure 3:
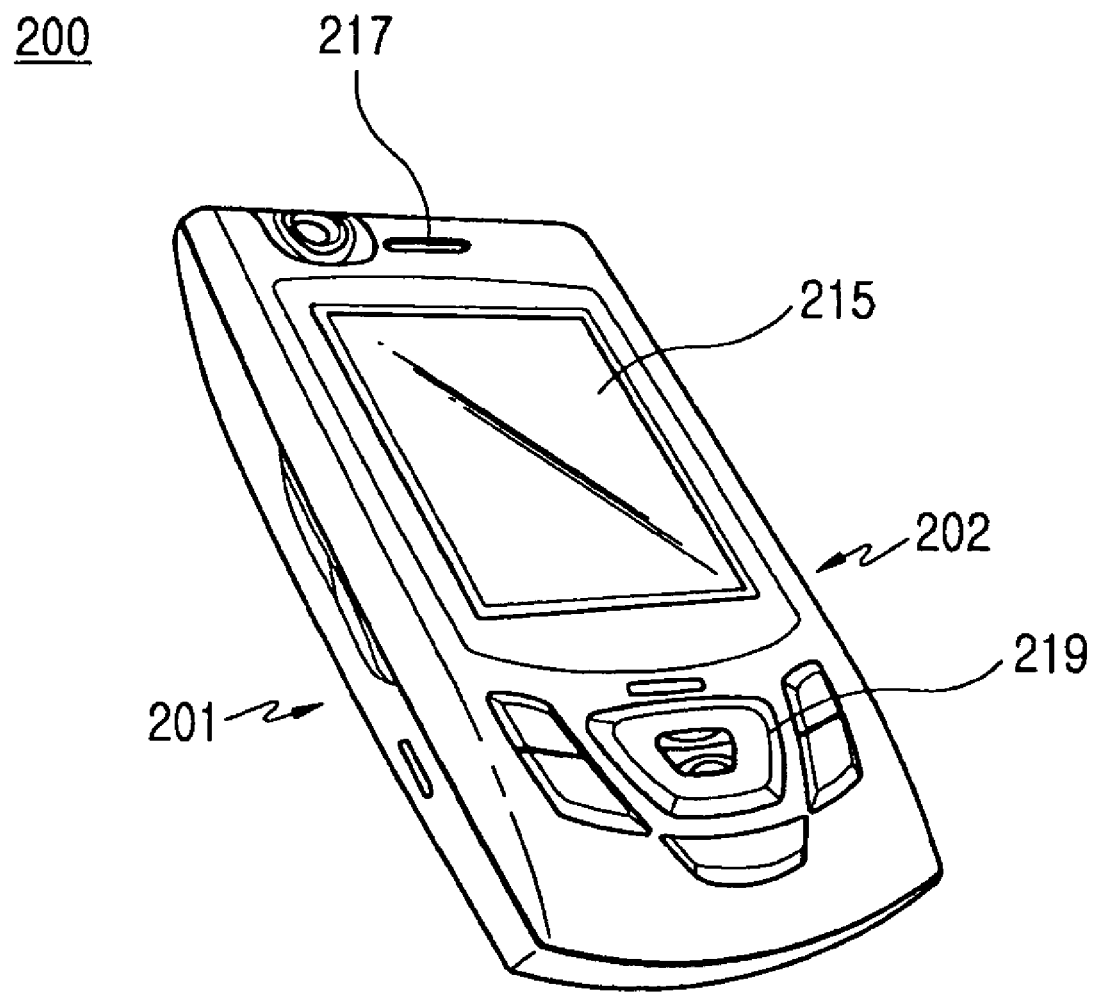
FIG. 3 is a perspective view of the portable terminal of FIG. 1.
Figure 4:
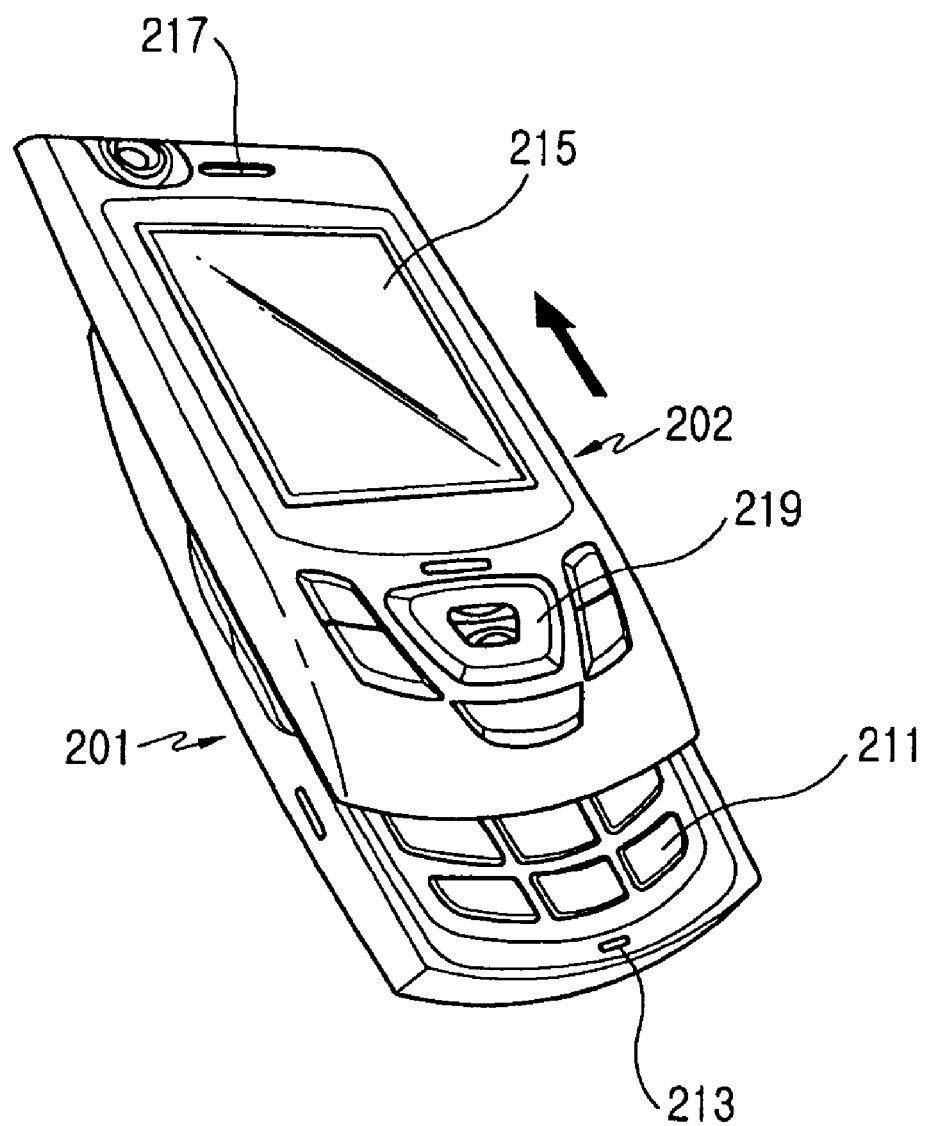
FIG. 4 is a perspective view showing a second housing of the portable terminal of FIG. 1 sliding with respect to a first housing.
Figure 5:
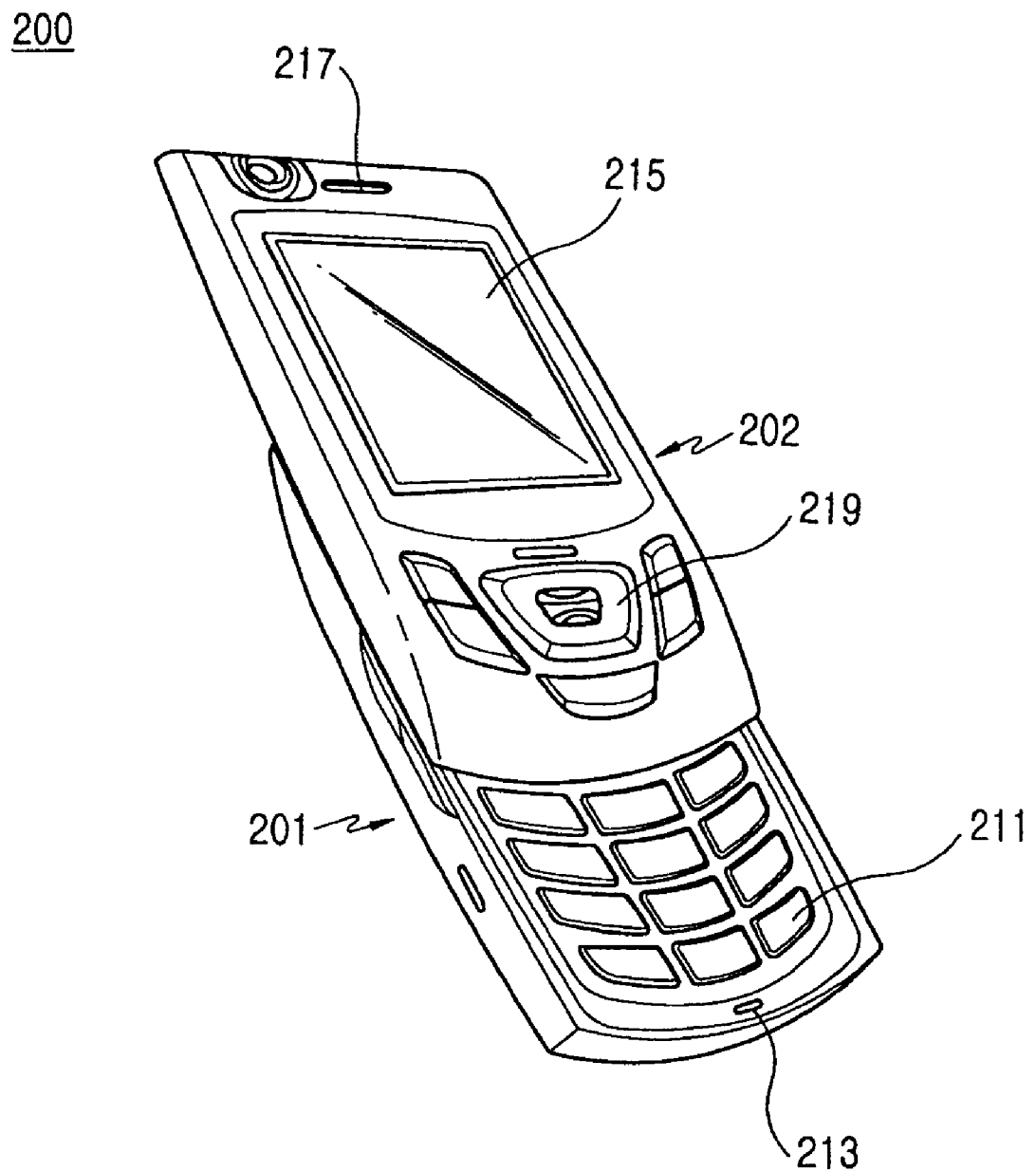
FIG. 5 is a perspective view showing the second housing of the portable terminal of FIG. 1 completely opening a face of a first housing of the portable terminal of FIG. 1.

FIG. 1 is an exploded perspective view of a portable terminal 200 having a sliding module 100 according to an exemplary embodiment of the present invention. FIG. 2 is an exploded perspective view of the sliding module 100 of FIG. 1. As shown in FIGS. 1 and 2, the portable terminal 200 includes a first housing 201 and a second housing 202 that is slidably combined with a face of the first housing 201. Referring to FIGS. 3 through 5, a keypad 211 and a transmitting unit 213 are mounted in a face of the first housing 201, and a function keypad 219, a display device 215, and a receiving unit 217 are mounted in a face of the second housing 202. As the second housing 202 slides up or down on the first housing 201, the keypad 211 and the transmitting unit 213 are closed or opened.

Referring back to FIGS. 1 and 2, the sliding module 100 includes a guide plate 101 fixed to a face of the first housing 201 and at least one pair of guide rods 121 mounted spaced apart in the rear face of the second housing 202.

Although the guide plate 101 is shown mounted to the rear face of the second housing 202 in FIG. 1, the guide plate 101 is fixed to a face of the first housing 201 and slides with respect to the second housing 202 on the rear face of the second housing 202.

The guide plate 101 is preferably made of a metallic material and has guide ribs 111, preferably made of polyoxymethylene (POM), at both side ends. The guide ribs 111 include through holes 113 that penetrate longitudinally. Preferably, the guide plate 101 is made of a metallic material to provide robustness and reliability.

A plurality of fastener holes for fastening the guide plate 101 to the first housing 201 are formed in the guide plate 101. Some of the fastener holes are used to not only fasten the guide plate 101 to the first housing 201 but also to fasten the guide ribs 111 to the guide plate 101.

Both ends of the guide rods 121 are secured to the second housing 202, and the guide ribs 111 are slidably connected to the guide rods 121 through the through holes 113 of the guide ribs 111. Thus, the guide rods 121 are slidably combined with the guide plate 101 through the guide ribs 111, which are preferably made of POM, thereby reducing noise generated by sliding.

A pair of guide grooves 221 that extend along a sliding direction of the guide rods 121 are formed in the rear face of the second housing 202 to facilitate securing the guide rods 121 to the second housing 202. The guide grooves 221 are formed spaced apart and the guide rods 121 are positioned in the guide grooves 221.

To facilitate assembly of the guide rods 121, a connection member 103 is assembled in the second housing 202. The inner wall of one end of the guide grooves 221 is closed. Connection holes 223 are formed in the inner wall of the other end of the guide grooves 221 and thus the inner wall of the other end of the guide grooves 221 is opened. The guide grooves 221 are connected with the inner side of the second housing 202 through the connection holes 223. The connection member 103 is combined with the inner side of the second housing 202 and closes the connection holes 223. Thus, a portion of the connection member 103 is exposed to the rear face of the second housing 202 through the connection holes 223 and the guide rods 121 are assembled to the connection member 103 exposed to the rear face of the second housing 202.

The connection member 103 includes a connection rib 131 attached to the inner side of the second housing 202, connection protrusions 133 that are formed on the connection rib 131 to close the connection holes 223, and support holes 135 that are formed in the connection protrusions 133 to support the ends of the guide rods 121. To restrict movement of the ends of the guide rods 121 in the support holes 135, dampers 123a having elasticity are further included in the support holes 135. As a result the connection member 103 is configured to close the connection holes 223 and to support ends of the guide rods 121. Particularly, the connection protrusions 133 close the connection holes 223 and the support holes 135 formed in the connection protrusions 133 support the ends of the guide rods 121 respectively. Therefore, only a pair of the connection protrusions 133 formed with the support holes 135 respectively can be used in the sliding module 100 to close the connection holes 223 and to support ends of the guide rods 121.

Another connection hole (not shown) is further formed in one end of the guide grooves 221. The connection holes 223 formed in one end of the guide grooves 221 are used to support the other end of the guide rods 121. Dampers 123b are combined with the connection holes 223 in one end of the guide grooves 221 to restrict movement of the other end of the guide rods 121 for a stronger assembly.

The dampers 123a and 123b protrude to a certain extent on the guide grooves 221 to alleviate shock generated when the guide plate 101 is run against the walls of ends of the guide grooves 221 while sliding on the second housing 202.

Since both ends of the guide rods 121 are fixed to the rear face of the second housing 202 and the guide rods 121 are slidably combined with the guide plate 101 fixed to the first housing 201 through the guide ribs 111, the second housing 202 is slidably connected to the first housing 201 through the sliding module 100.

The sliding module 100 may include at least one torsion spring 104 that provides a driving force in a direction in which the second housing 202 closes a face of the first housing 201 in a predetermined section and a driving force in a direction in which the second housing 202 opens the face of the first housing 201 in the remaining section.

The torsion spring 104 includes a coil 141 capable of accumulating an elastic force and a pair of fixing ends 143 that extend in directions away from the coil 141. One of the fixing ends 143 is rotatably supported on the rear face of the second housing 202 and the other fixing end 143 is rotatably supported in a spring hole 115 formed on the guide plate 101. The sliding module 100 may include coupling members 117 that are made of polyoxymethylene. The coupling members 117 are fixed to the spring hole 115 respectively so as to support the end portion of the other fixing end 143 rotatably. As the second housing 202 slides, the fixing ends 143 of the torsion spring 104 move closer together or farther apart. The closest position of the fixing ends 143 to each other exists within a section where the second housing 202 slides.

In one side section with respect to a position where the fixing ends 143 get closest to each other, the torsion spring 104 provides a driving force in a direction in which the second housing 202 closes a face of the first housing 201. In the other side section with respect to the closest position of the fixing ends 143 to each other, the torsion spring 104 provides a driving force in a direction in which the second housing 202 opens the face of the first housing 201.

The second housing 202 moves in a section where the keypad 211 and the transmitting unit 213 may be opened or closed. The guide plate 101 fixed to a face of the first housing 201 is closed at all times regardless of whether the second housing 202 slides.

Hereinafter, opening and closing of the portable terminal 200 and a process of exerting a driving force by the sliding module 100, particularly, the elastic force of the torsion spring 104 is described with reference to FIGS. 3 through 5.

In FIG. 3, the second housing 202 completely closes the first housing 201. At this time, the guide plate 101 is positioned on the guide grooves 221 as shown in FIG. 1. In one side section with respect to the closest position of the fixing ends 143 to each other, the fixing ends 143 are positioned most away from each other when the second housing 202 completely closes the first housing 201.

As shown in FIG. 4, if a user gradually slides the second housing 202, the fixing ends 143 get closer to each other and an elastic force is accumulated in the coil 141. The elastic force accumulates in the coil 141 until the second housing 202 passes the closest position of the fixing ends 143 to each other and serves as a driving force for moving the second housing 202 in a direction in which the second housing 202 closes the first housing 201 again.

If the user further moves the second housing 202 such that the second housing 202 passes the closest position of the fixing ends 143 to each other, the elastic force accumulated in the coil 141 serves as a driving force for moving the second housing 202 in a direction in which the second housing 202 completely opens a face of the first housing 201, that is, the keypad 211 and the transmitting unit 213. Thus, if the user slides the second housing 202 only until the second housing 202 passes the closest position of the fixing ends 143 to each other, a face of the first housing 201 is opened by the elastic force of the torsion spring 104 in the remaining section.

FIG. 5 is a perspective view showing the second housing 202 completely opening a face of the first housing 201. At this time, in the other side section with respect to the closest position of the fixing ends 143 to each other, the fixing ends 143 are positioned most away from each other when the second housing 202 completely opens the keypad 211 and the transmitting unit 213 of the first housing 201.

When the user desires to close the first housing 201 again, the user slides the second housing 202. In the same manner as when the first housing 201 is opened, if the user slides the second housing 202 only until the second housing 202 passes the closest position of the fixing ends 143 to each other, the second housing 202 moves by the elastic force of the torsion spring 104 in a direction in which the second housing 202 closes the first housing 201 in the remaining section.

As described above, according to exemplary embodiments of the present invention, guide rods are directly mounted in the rear face of a second housing and guide grooves are formed in the rear face of the second housing to accommodate guide ribs of a guide plate fixed to a first housing, thereby reducing the thickness of a portable terminal. Moreover, because the guide rods penetrate the guide ribs, it is possible to more effectively reduce the thicknesses of a sliding module and the portable terminal. Additionally, using a torsion spring, a semi-automatic opening and closing operation is implemented by a driving force provided in a direction in which the first housing is closed in a predetermined section and a driving force provided in a direction in which the first housing is opened in the remaining direction, thereby facilitating use of the portable terminal. Because the guide rods are directly mounted in the second housing using a connection member for facilitating assembly, assembly efficiency and productivity are improved.

While the invention has been shown and described with reference to a certain preferred embodiment thereof, it will be understood by those skilled in the art that various changes in form and details may be made therein without departing from the spirit and scope of the invention.

What is claimed is:

1. A portable terminal comprising:
   a first housing;
   a second housing slidably connected to the first housing such that the second housing slides longitudinally on the first housing to open or close a face of the first housing; and
   a sliding module disposed between the first housing and the second housing to slidably connect the second housing to the first housing,
   wherein the sliding module includes
      a pair of spaced apart guide rods mounted on the rear face of the second housing in a sliding direction of the second housing;
      a connection member including a connection rib secured to an inner side of the second housing and connection protrusions formed on the connection rib and exposed to the rear face of the second housing; and
      a guide plate fixed to the face of the first housing,
      wherein one end of the guide rods is supported on the rear face of the second housing and the other end of the guide rods is supported by the connection protrusions, and the guide plate is slidably connected to the guide rods.

2. The portable terminal of claim 1, wherein
the connection member further includes support holes formed in the connection protrusions and the other end of the guide rods is supported by the support holes.

3. The portable terminal of claim 1, further comprising:
a pair of guide grooves provided at the rear face of the second housing and extend in a longitudinal direction of the second housing, wherein the guide rods are positioned in the guide grooves.

4. The portable terminal of claim 1, further comprising:
a pair of guide grooves provided at the face of the second housing and extending in a longitudinal direction of the second housing, one end of the guide grooves is opened respectively and that is connected with an inner side of the second housing;
wherein the connection protrusions close the opened end of the guide grooves and one end of the guide grooves and the other end of the guide rods is supported by the connection protrusions that close the opened end of the guide grooves.

5. The portable terminal of claim 1, further comprising:
guide ribs are provided at both ends of the guide plate; and
through holes are formed in the guide ribs such that the guide rods slidably move through the through holes.

6. The portable terminal of claim 5, wherein
the guide ribs are made of polyoxymethylene (POM).

7. The portable terminal of claim 5, wherein
the guide plate is made of a metallic material.

8. The portable terminal of claim 1, further comprising:
a pair of guide grooves provided at the rear face of the second housing and extend in a longitudinal direction of the second housing; and
a damper provided at both ends of the guide rods;

wherein one end of the guide rod is supported in the inner walls at one of the both ends of the guide grooves, and the other end of the guide rod is supported by the connection protrusions.

9. The portable terminal of clam 1, further comprising:

at least one torsion spring including a coil and a pair of fixing ends that extend in directions away from each other to provide an elastic force, wherein one of the fixing ends is rotatably supported on the guide plate and the other end is rotatably supported on the rear face of the second housing.

10. The portable terminal of clam 9, wherein a position where the fixing ends get closest to each other exists within a section where the second housing slides, the elastic force of the torsion spring serves as a driving force for moving the second housing in a direction in which the second housing closes a face of the first housing within one side section with respect to a position where the fixing ends get closest to each other.

11. The portable terminal of clam 10, wherein the elastic force of the torsion spring serves as a driving force for moving the second housing in a direction in which the second housing opens the face of the first housing within the other side section with respect to the position where the fixing ends get farthest from each other.

12. The portable terminal of clam 9, wherein a pair of torsion springs are connected between the guide plate and the rear face of the second housing.

13. The portable terminal of clam 1, further comprising:

guide grooves provided on the rear face of the second housing and extending in a longitudinal direction of the second housing;

guide ribs provided at both side ends of the guide plate and slidably positioned in the guide grooves; and through holes formed in the guide ribs, wherein one end of the guide rod is supported in the inner walls at one of the both ends of the guide grooves, and the other end of the guide rod is supported by the connection protrusions.

14. A portable terminal, comprising:

a first housing;

a second housing;

a guide plate secured to a face of the first housing;

a guide rib connected to opposite sides of the guide plate;

a connection member including a connection rib secured to an inner side of the second housing and connection protrusions formed on the connection rib and exposed to a rear face of the second housing; and a pair of spaced apart guide rods mounted on the rear face of the second housing, the guide plate being slidably connected to the guide rods by the guide ribs such that the second housing slides with respect to the first housing to cover and uncover a portion of the face of the first housing, and wherein one end of the guide rods is supported on the rear face of the second housing, and the other end of the guide rods is supported by the connection protrusions.

15. The portable terminal of claim 14, wherein the guide plate is made of a metallic material.

16. The portable terminal of claim 14, wherein the guide ribs are made of polyoxymethylene (POM).

17. The portable terminal of claim 14, wherein elastic dampers are disposed at each end of the guide rods.

18. The portable terminal of claim 14, wherein a resilient member is disposed between the guide plate and the second housing to facilitate sliding of the second housing.

19. The portable terminal of claim 18, wherein the resilient member is a torsion spring.

20. The portable terminal of claim 19, wherein a first end of the torsion spring is connected to the guide plate and a second end is connected to the second housing.

* * * * *

UNITED STATES PATENT AND TRADEMARK OFFICE
CERTIFICATE OF CORRECTION

PATENT NO. : 7,580,267 B2
APPLICATION NO. : 11/375059
DATED : August 25, 2009
INVENTOR(S) : Yong-Kyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Fourteenth Day of December, 2010

David J. Kappos
*Director of the United States Patent and Trademark Office*